(12) United States Patent
Mastrogiannis

(10) Patent No.: US 11,012,029 B2
(45) Date of Patent: May 18, 2021

(54) SUPPORT BASEMENT FOR PHOTOVOLTAIC PANELS

(71) Applicant: Spyridon Mastrogiannis, Kamatero Attikis (GR)

(72) Inventor: Spyridon Mastrogiannis, Kamatero Attikis (GR)

(73) Assignee: Ray Dahdal, Philadelphia, PA (US)

( * ) Notice: Subject to any disclaimer, the term of this patent is extended or adjusted under 35 U.S.C. 154(b) by 312 days.

(21) Appl. No.: 15/302,851

(22) PCT Filed: Apr. 9, 2015

(86) PCT No.: PCT/GR2015/000020
§ 371 (c)(1),
(2) Date: Oct. 7, 2016

(87) PCT Pub. No.: WO2015/155554
PCT Pub. Date: Oct. 15, 2015

(65) Prior Publication Data
US 2017/0025990 A1    Jan. 26, 2017

(30) Foreign Application Priority Data
Apr. 10, 2014   (GR) .............................. 20140100200

(51) Int. Cl.
*H02S 30/20* (2014.01)
*H02S 20/10* (2014.01)
(Continued)

(52) U.S. Cl.
CPC .............. *H02S 30/20* (2014.12); *F24S 20/50* (2018.05); *F24S 25/13* (2018.05); *F24S 25/65* (2018.05); *F24S 40/10* (2018.05); *F24S 40/85* (2018.05); *H02S 20/10* (2014.12); *H02S 30/10* (2014.12); *F24S 25/617* (2018.05); *F24S 2025/6003* (2018.05); *F24S 2025/6005* (2018.05); *Y02E 10/47* (2013.01)

(58) Field of Classification Search
None
See application file for complete search history.

(56) References Cited

U.S. PATENT DOCUMENTS

| | | | |
|---|---|---|---|
| 2008/0092936 A1* | 4/2008 | Carabillo | A45B 3/04 135/16 |
| 2013/0153520 A1* | 6/2013 | Mastroyiannis | F24S 25/30 211/26 |

* cited by examiner

*Primary Examiner* — Shannon M Gardner

(57) ABSTRACT

A support basement adapted to support fixedly mounted or extensible and collapsible photovoltaic panels that comprises a plurality of triangular arrays (53) interconnected by tubular members (21) and constructed with links (54, 55) and radially extending tubular members (1). Profile members (24, 30, 84) extending longitudinally along each photovoltaic panel connect the profile frames (37, 39, 69) of the photovoltaic panels to underlying triangular arrays (53) by means of connector assemblies comprising bolts (10) and nuts (12). Adjustable connector assemblies comprising bolts (27) and nuts (29*a*, 29*b*) are used to connect bottom links (55) of triangular arrays (53) with profile members (41) based onto ground pillars (51). A retraction mechanism of the photovoltaic panels offering protection from adverse weather conditions and during night periods comprises sequentially connected X-configured assemblies with an elongate screw (72) rotatable within nuts (71) at the ends of a terminal X-configured assembly proximally to the protective housing (86).

16 Claims, 10 Drawing Sheets

(51) Int. Cl.
*H02S 30/10* (2014.01)
*F24S 40/10* (2018.01)
*F24S 25/65* (2018.01)
*F24S 20/50* (2018.01)
*F24S 25/13* (2018.01)
*F24S 40/80* (2018.01)
*F24S 25/60* (2018.01)
*F24S 25/617* (2018.01)

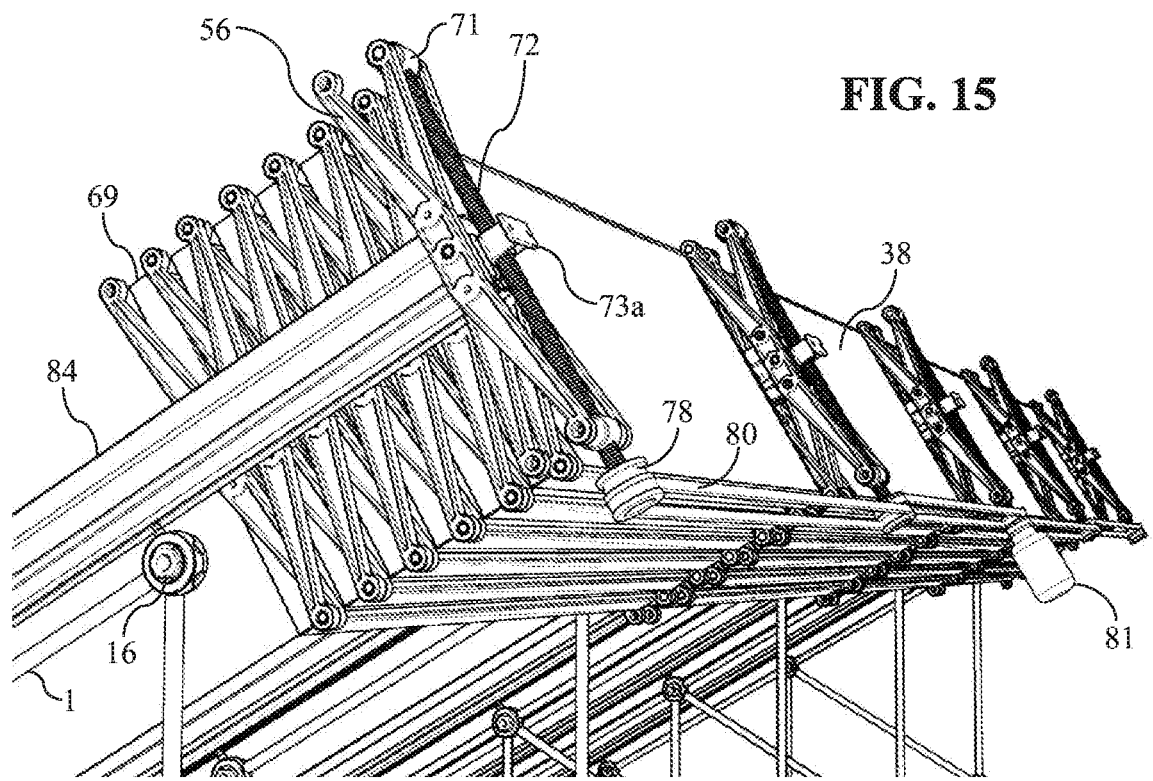
FIG. 15
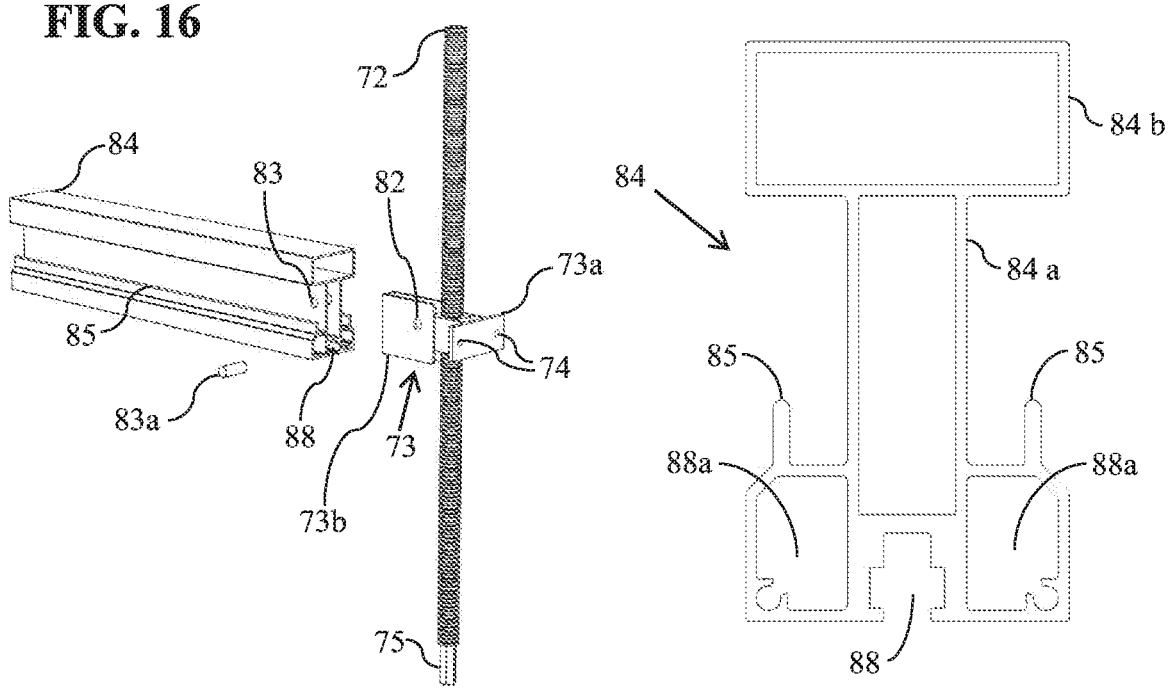
FIG. 16
FIG. 16a

SUPPORT BASEMENT FOR PHOTOVOLTAIC PANELS

THE FIELD OF THE ART

The invention relates to a support basement adapted to support fixedly mounted or extensible and collapsible photovoltaic panels that may be retracted within a protective housing with a scope of being protected during the non-productive periods of the night or upon encountering of adverse weather conditions.

BACKGROUND ART

The prior art relating to basements for photovoltaic panels does not provide any identical or similar basement structure.

Prior art basements are limited in providing fixed basements and basements rotatable around a single axis or a pair of axes for one or two-directional tracking respectively. These basements of the prior art are however being constructed on site using heavy and bulky metallic profiles that are being cut and welded to assemble the basement, such method of construction requiring extensive measurements and care of skilled labour, thereby adding to the overall cost. Further the mode of support of the photovoltaic panels from the top thereof adds to construction difficulties, whereas it leaves room for accumulation of waste and water within the panel supporting profiles, thereby resulting in an aesthetically inappropriate structure.

It is therefore an object of the invention to overcome the abovementioned drawbacks of the prior art through providing a basement structure that can be rapidly assembled on site or transported ready to install from the factory, wherein the entire installation can be carried out by staff with no particularly necessary skills whatsoever, thereby substantially reducing installation costs and providing a structure of enhanced strength that may also be dismantled at any time without being discarded, but being suitable for being used again. The mode of construction of the basement of the present invention allows for immediate alignment and further provides, with the innovative links being employed to connect arrays of tubular members, the automatic orientation of the photovoltaic panels being supported at a preferred inclination of around 30° to provide for maximal exploitation of solar radiation.

A further disadvantage of basement structures of the prior art is that they do not provide for any means of protection of the photovoltaic panels in areas with sandstorms, snow and hail. In case of a snowfall, the photovoltaic panels are being covered by a thick layer of snow which prevents the appropriate operation thereof. A costly cleaning of the panels is therefore required to restore functional status of the panels or else it can take a long time for the snow to melt thereby leaving the photovoltaic plant in a nonoperative status and creating a substantial loss of revenues. Further in case of a strong hail, there always arises a risk of fracture of the glass panels that incorporate the PV cells and this may lead to a non-repairable damage that sums up into an enormous economic damage. Even in areas with frequent sandstorms, the sand covers the photovoltaic panels and this leads in a sharp decline of performance thereof, thereby necessitating a frequent cleaning that again is costly and difficult.

It is therefore a further object of the invention to provide a support basement of photovoltaic panels that provides for appropriate retracting of the photovoltaic panels within a protective housing in case of adverse weather conditions (e.g. snowfall or sandstorm or forecasted hail), thereby maintaining the panels safe from adverse weather hazards and saving costs associated with snow or sand cleaning and repair of damages that might occur if the panels are being left exposed in such adverse weather conditions.

The proposed support basement for selectively collapsible and extensible photovoltaic panels of the invention provides substantial advantages of a substantial economic benefit and it may also operate a scheduled retracting of the photovoltaic panels within the protective housing during the non-productive periods of night thereby offering preventive protection from any risk of damage whatsoever that might occur from the unnecessary exposure thereof.

SUMMARY OF THE INVENTION

A support basement for photovoltaic panels of the present invention comprises:
a plurality of integrated triangular arrays, each array being constructed with links that host arrangements of radially extending first tubular members,
wherein the array of links and of the radially extending first tubular members define a single planar structure;
profile members extending longitudinally on either side of each one of the photovoltaic panels, such profile members being connected to the abovementioned underlying integrated triangular arrays;
fixed connector assemblies, each comprising a bolt and a nut with the nuts being fixedly mounted within grooves at the bottom of abovementioned profile members and adapted to provide connection of the profile members to adjacent links of an integrated triangular array;
profile members adapted to provide support of each one of the plurality of integrated triangular arrays onto the ground;
adjustable connector assemblies, each comprising a bolt and a pair of nuts with a first nut fixedly mounted within a groove of the profile member that supports a triangular array onto the ground and a second nut screwed along the bolt so as to provide flush seating of a pair of end links and through those links of an integrated triangular array onto the ground, and a plurality of second tubular members arranged to connect successive parallel triangular arrays, wherein these second tubular members are being mounted within a central bore of the links and fixedly held therein by means of screws, wherein these second tubular members are perpendicularly oriented with respect to the single plane defined by the integrated triangular array.

The support basement for photovoltaic panels specified hereinabove is being alternatively adapted to support fixedly mounted photovoltaic panels within stationary frames constructed with a first type of profile members or to support extensible and collapsible photovoltaic panels within movable frames constructed with a second type of profile members, whereby, in the case of movable frames and panels, the support basement of the invention further comprises a retraction mechanism adapted to withdraw the photovoltaic panels within a protective housing during the night or when imposed by adverse weather conditions and re-extend the same at operating condition during day time or following removal of adverse weather conditions.

BRIEF DESCRIPTION OF THE DRAWINGS

The invention will be best understood by those skilled in the art by reference to the accompanying drawings in which:

FIG. 15 shows a perspective view of the retraction mechanism adapted to provide retraction of the X-configured assemblies and accordingly of the panels connected thereupon and storage thereof in a protective housing when necessary.

FIG. 16 shows a perspective view of the profile used to connect the support basement of the invention with a bearing located at the center of an elongate screw member of the retraction mechanism shown in FIG. 15.

FIG. 16a shows a sectional view of the profile of FIG. 16 that is used to connect the support basement of the invention with the retraction mechanism of the extensible/collapsible photovoltaic panels.

DETAILED DESCRIPTION OF PREFERRED EMBODIMENTS

The invention will be hereinafter described by reference to the illustrative embodiments presented in the accompanying drawings.

The figures show a support basement of the invention with fixed or retractable and extendable photovoltaic panels that may be stored within a protective housing 86. The support basement is configured as a triangular array that is assembled rapidly with links 54, 55, each link comprising a plurality of radially extending tubular members, wherein the links and tubular members define a planar structure.

Figure 1:
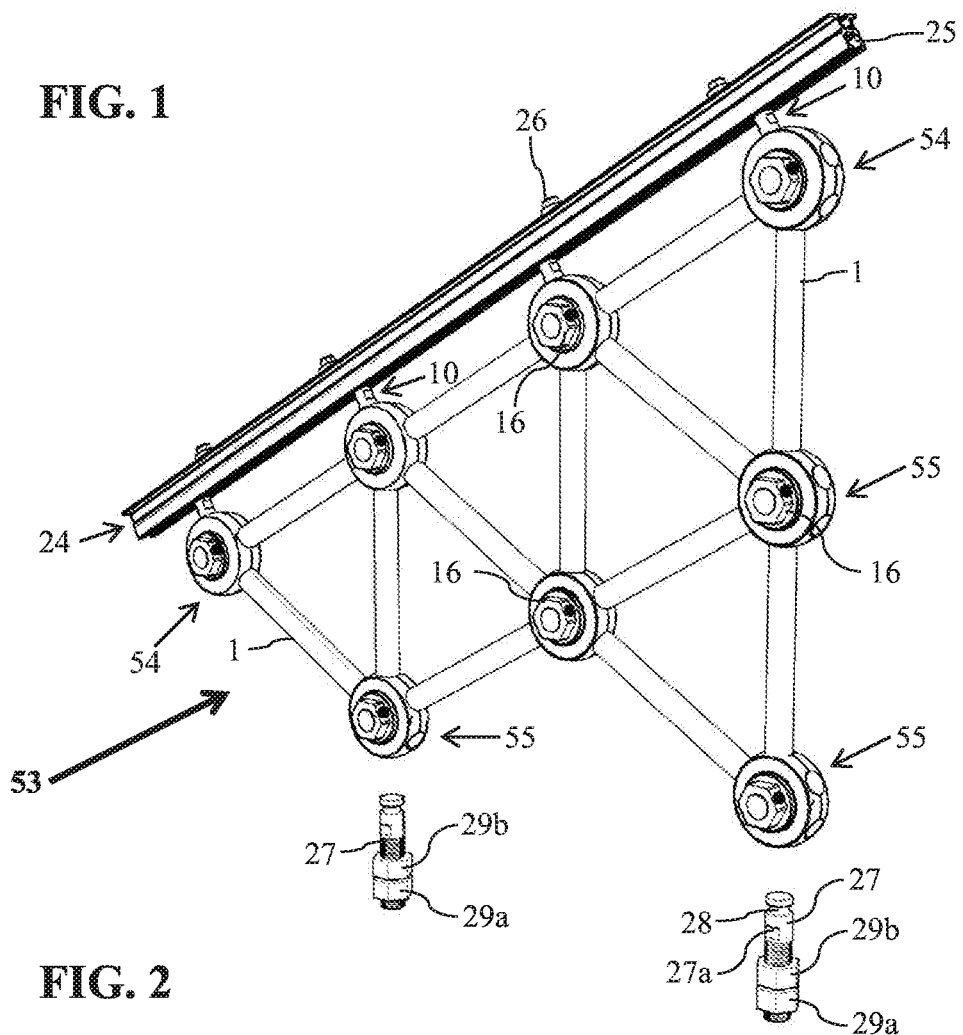
FIG. 1 shows in perspective the support basement of the invention comprising an integrated triangular array assembled with a plurality of tubular members joined and a set of links, the triangular array being connected to a profile member that is connected to the profile frame of a photovoltaic panel.
Figure 4:
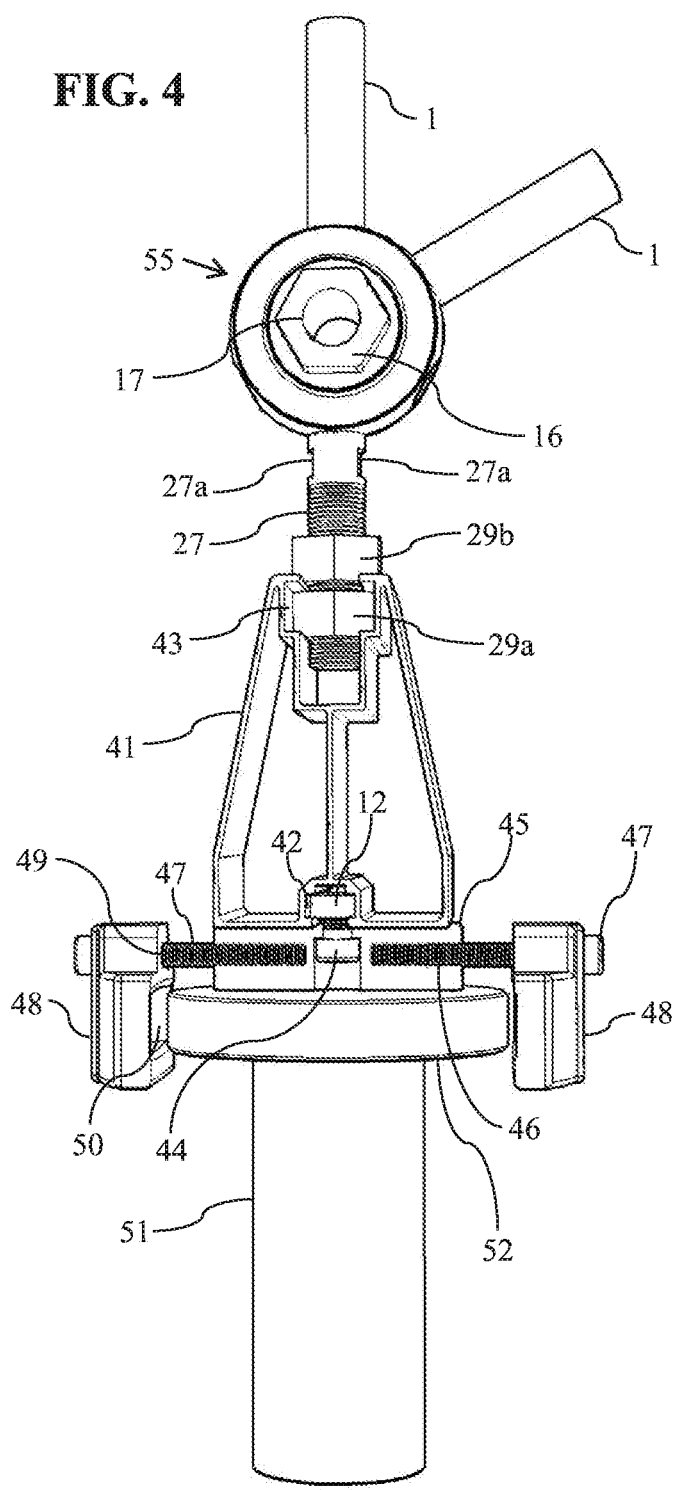
FIG. 4 shows a frontal perspective view of a bottom link of the triangular array of FIG. 1 connected to a profile member adapted to provide support of the triangular array onto the ground in combination with an underlying pillar and bearing arrangement.
Figure 4A:
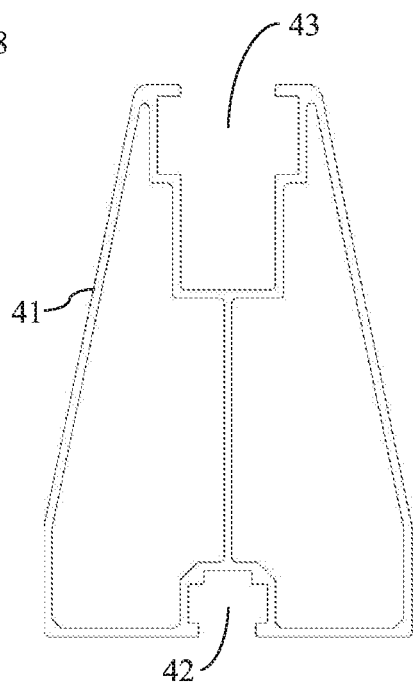
FIG. 4a shows a sectional view of the profile member of FIG. 4.
Figure 5:
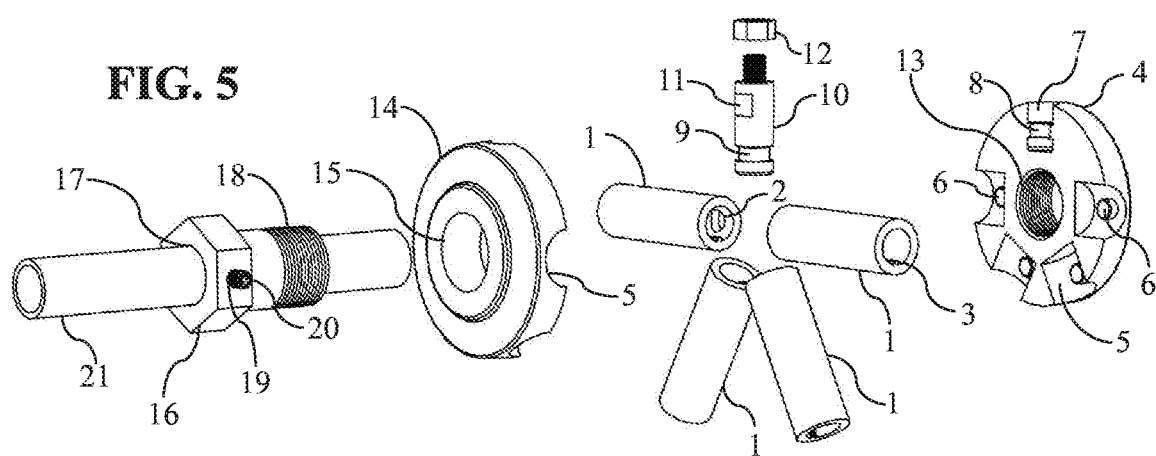
FIG. 5 shows a perspective exploded view of a first type of link employed in the assembly of a triangular array together with the radially extending tubular members and a central connector means thereof. A connector bolt and nut assembly used to connect the link with an overlying profile member is also depicted.
Figure 6:
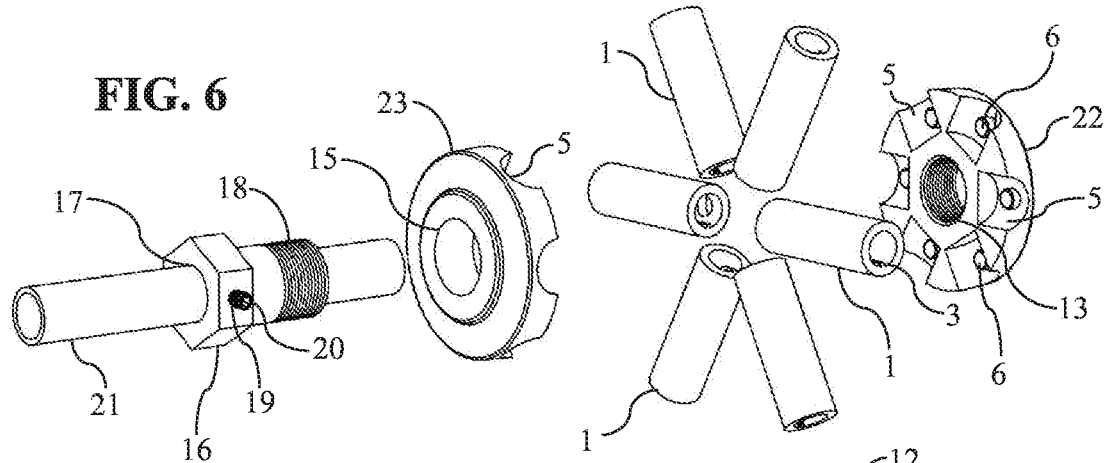
FIG. 6 shows a perspective exploded view of a second type of link employed in the assembly of a triangular array together with the radially extending tubular members and a central connector means thereof.
Figure 7:
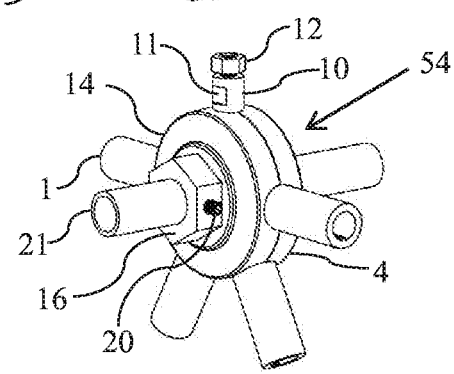
FIG. 7 shows a perspective view of the assembled link of FIG. 5.
Figure 8:
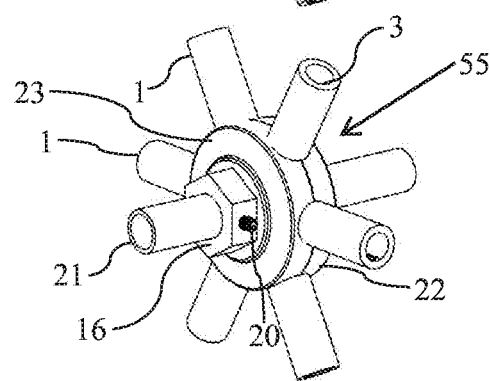
FIG. 8 shows a perspective view of the assembled link of FIG. 6.
Figure 9:
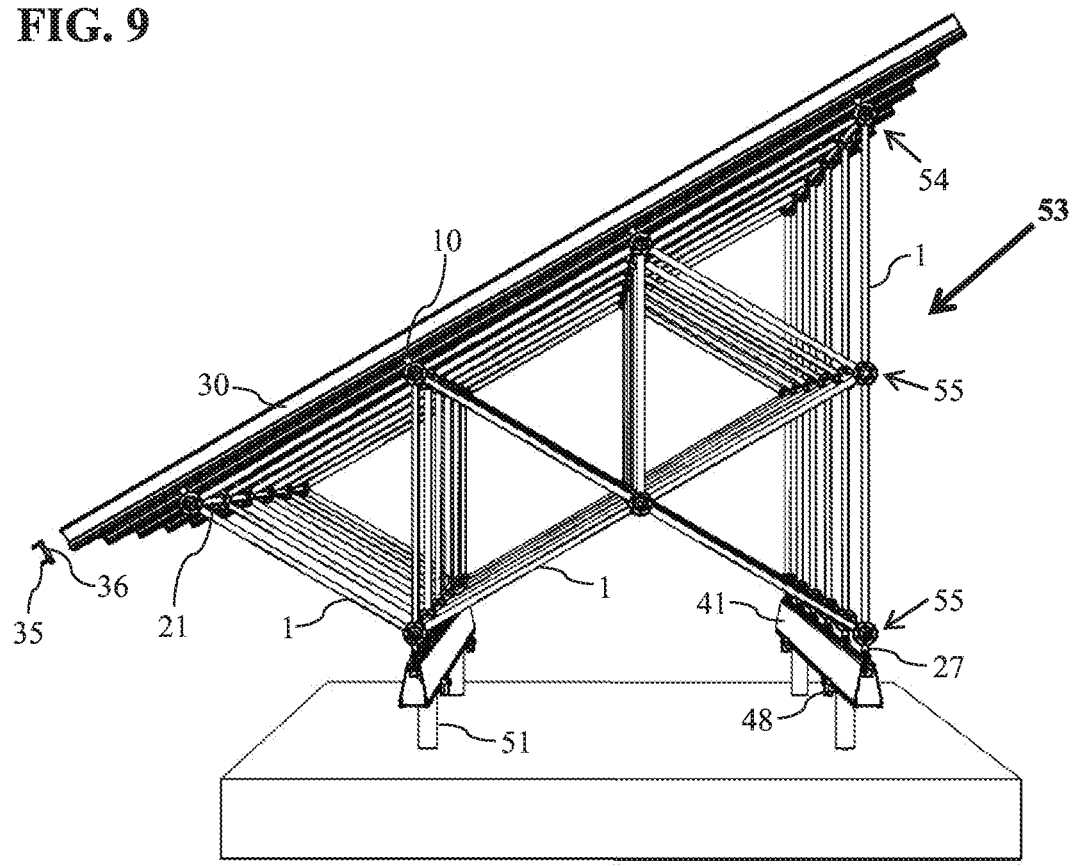
FIG. 9 shows a side perspective view of the support basement of the invention adapted to support photovoltaic panels fixedly mounted thereupon.
Figure 10:
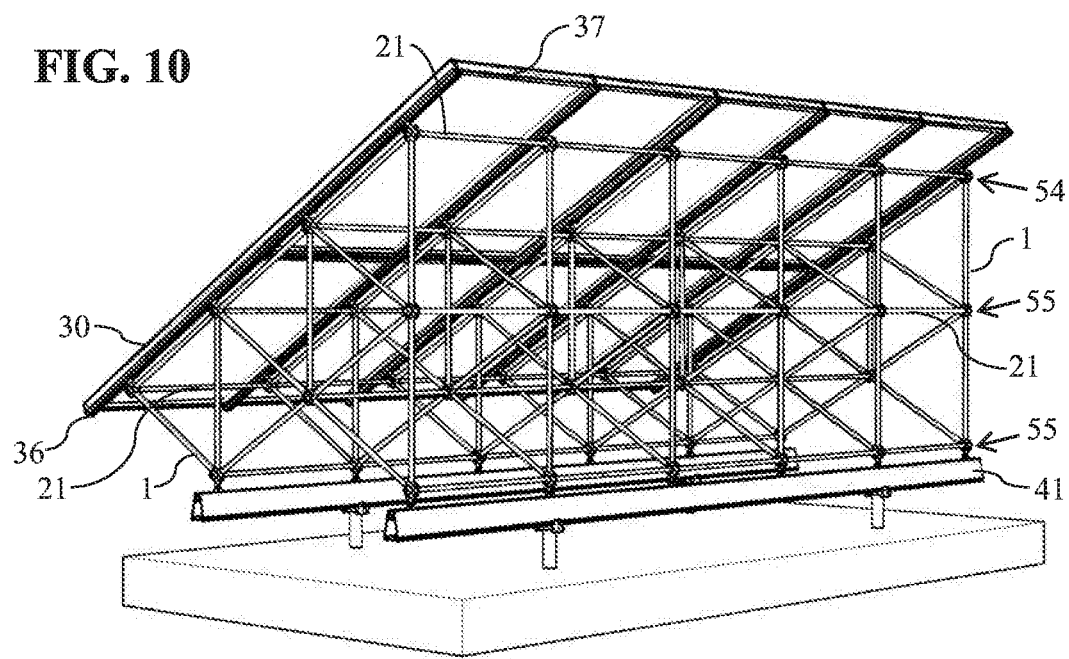
FIG. 10 shows a rear perspective view of the support basement of the invention adapted to support photovoltaic panels fixedly mounted thereupon.
Figure 11:
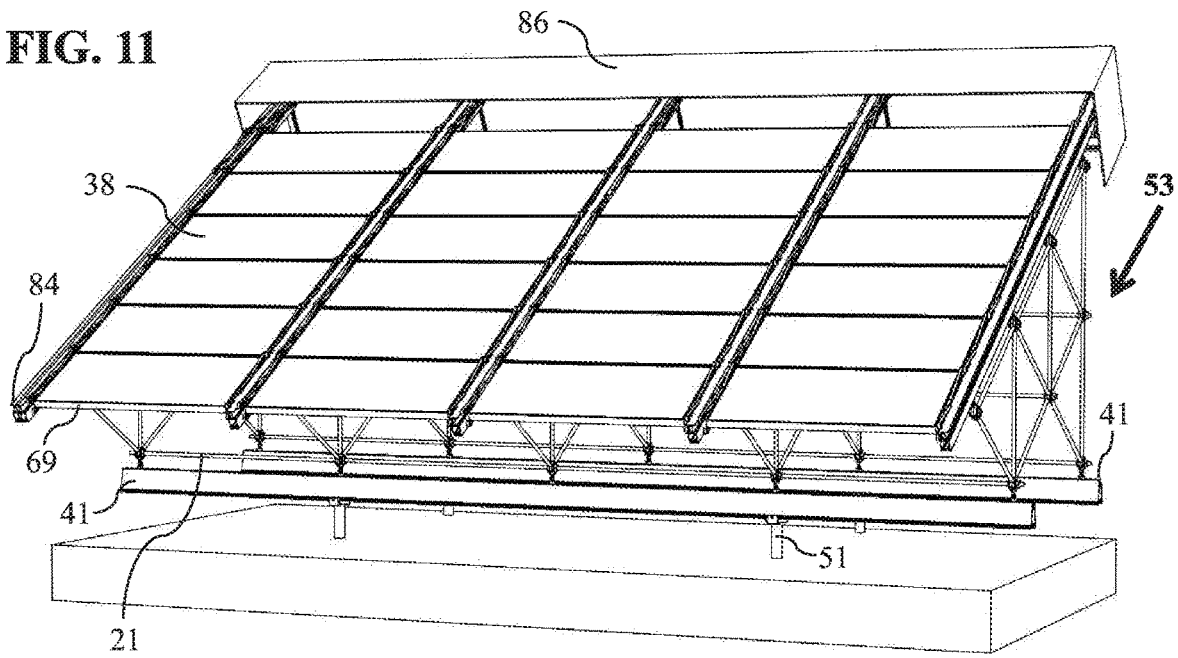
FIG. 11 shows a perspective view of the support basement of the invention to adapt to support extensible and collapsible photovoltaic panels with the photovoltaic panels in a fully developed condition outside of the protective housing.
Figure 12:
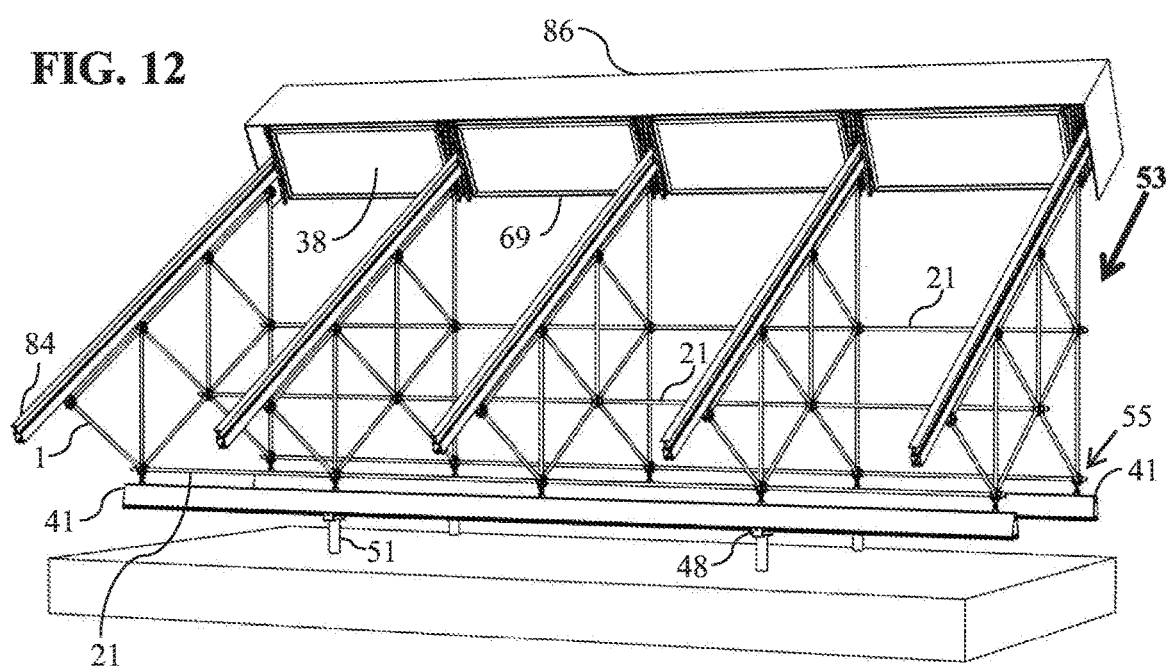
FIG. 12 shows a perspective view of the support basement of the invention of FIG. 11 with the photovoltaic panels in a fully retracted condition stored within the protective housing.
Figure 13:
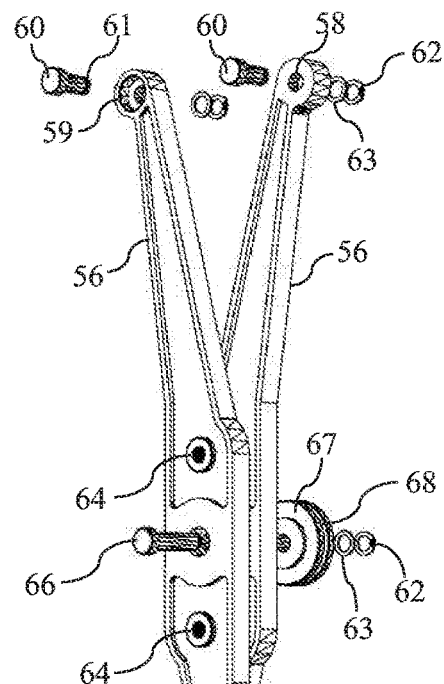
FIG. 13 shows a perspective view of an X-configured assembly with a pair of arms connected with a shaft at the middle thereof, a rolling wheel being further mounted onto the shaft and a washer and snap ring provided at the end thereof.
Figure 14:
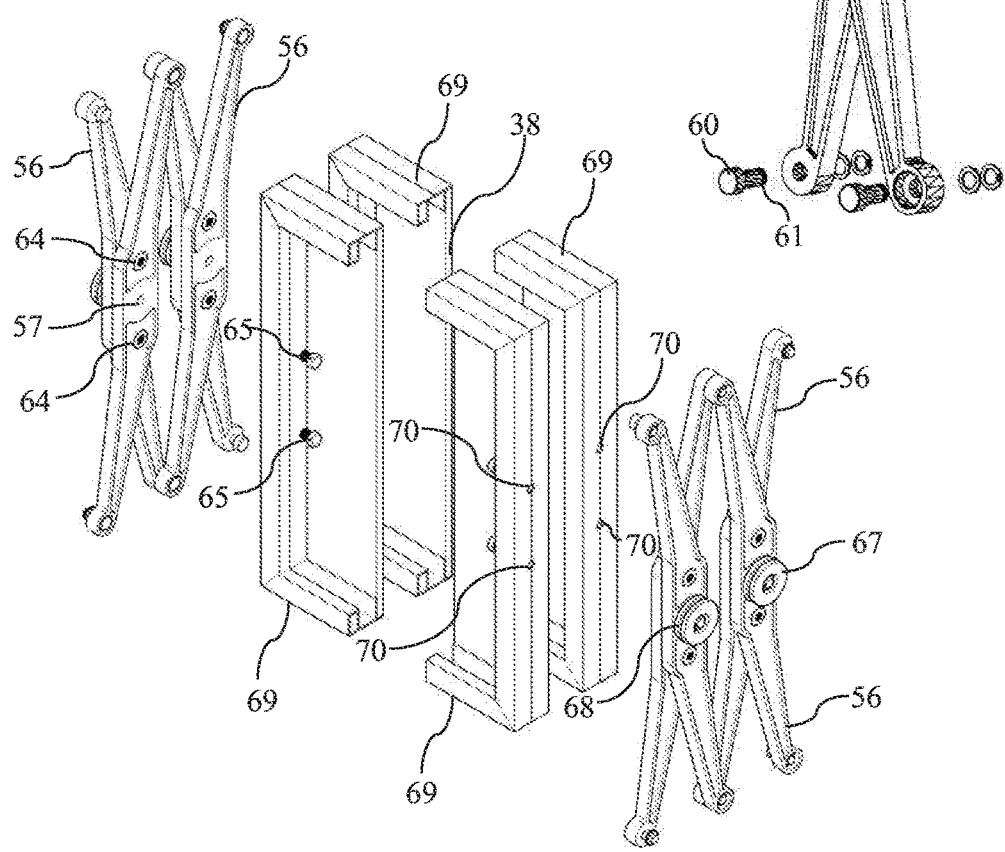
FIG. 14 shows a perspective view of a pair of the X-configured assemblies of FIG. 13 being brought for connection with corresponding photovoltaic panels.
Figure 17:
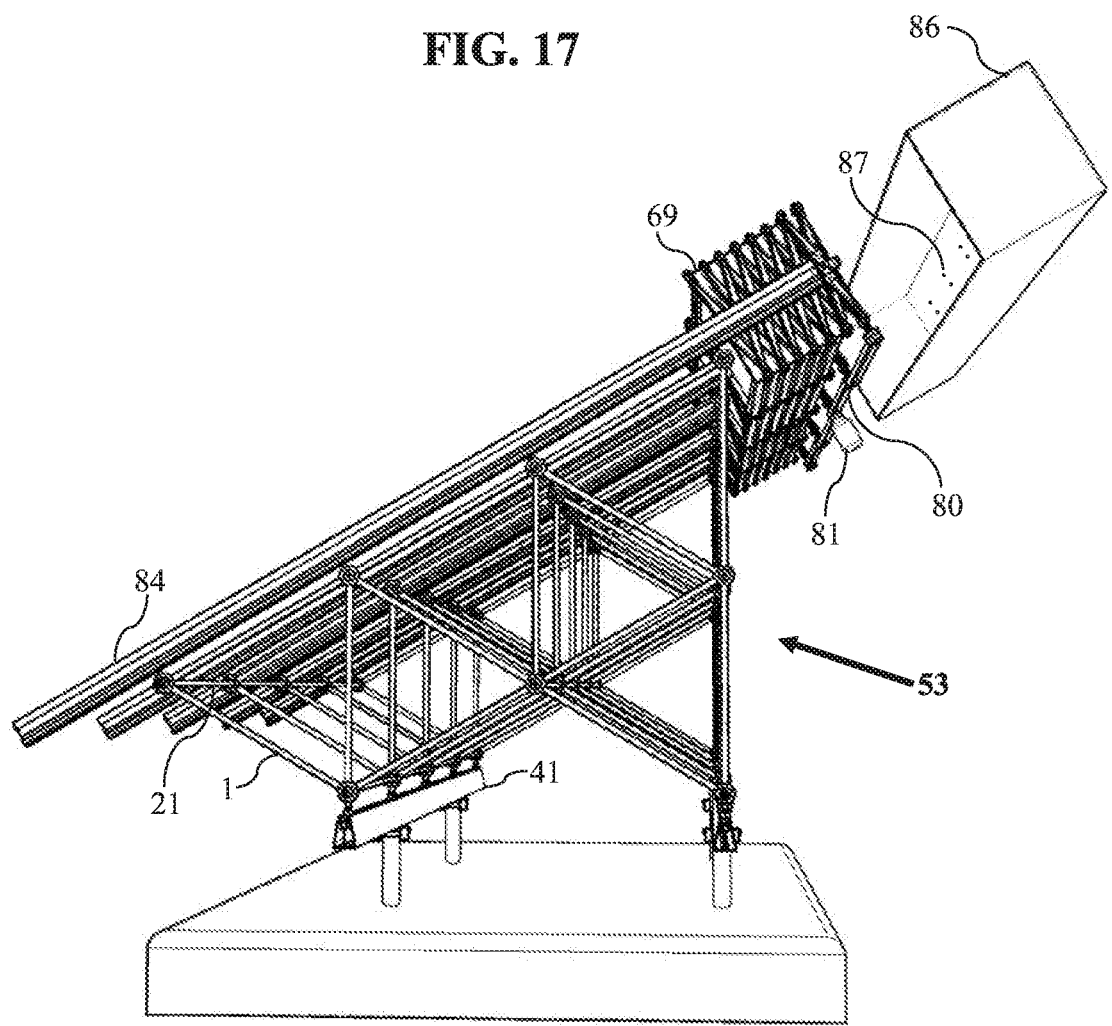
FIG. 17 shows a side perspective view of an assembly of extensible/collapsible photovoltaic panels and of the X-configured assemblies thereof in a retracted condition prior to their introduction in the protective housing.
Figure 18:
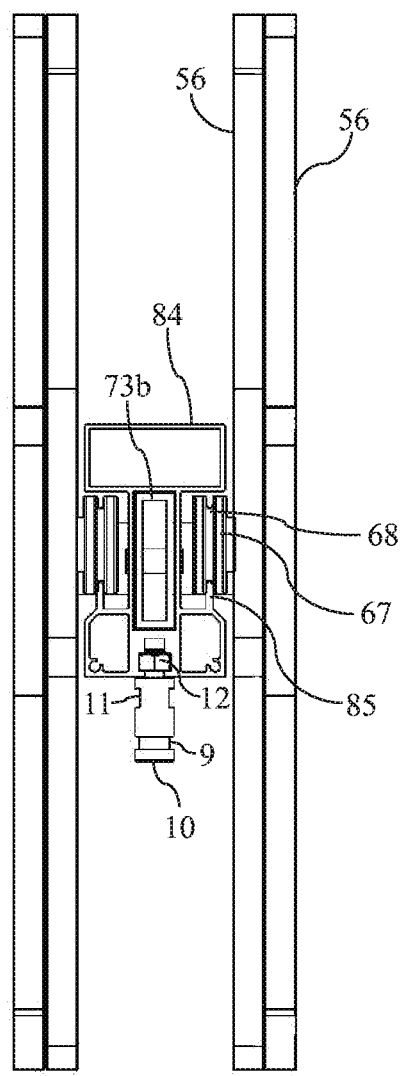
FIG. 18 shows a sectional view of the profile of FIG. 16 with a pair of X-configured assemblies and the wheels adapted to slide the same on both sides thereof.
Figure 19:
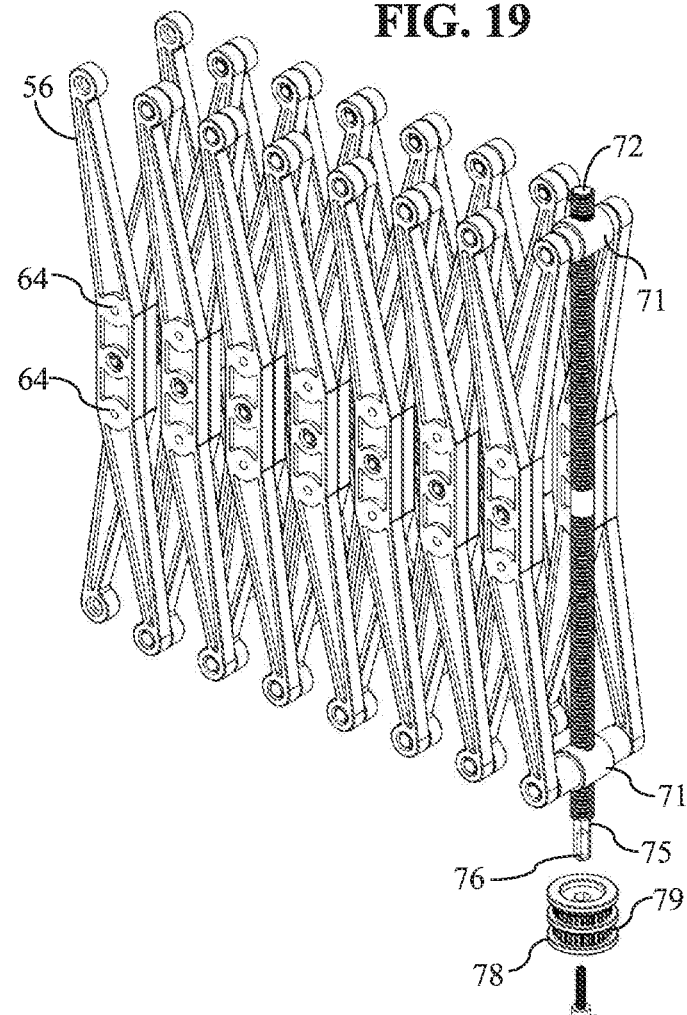
FIG. 19 shows a perspective view of the arrangement of X-configured assemblies with the elongate screw of the retraction mechanism adapted to rotate within nuts provided at the top and bottom of the X-configured assembly proximate to the protective housing and with the underlying wheel that provides rotational motion to timing belts that pass through channels thereof.

As shown in FIG. 1 a typical integrated triangular array 53 of the invention is composed of thirteen tubular members 1, a series of four links 54 lined longitudinally below a profile member 24 and four links 55 underlying the links 54. Eight special bolts 16 are employed to connect each of the links 54 and 55. Profile members 41 shown in FIG. 4 and FIG. 4a are used to provide support of each one of the plurality of integrated triangular arrays 53 onto the ground. Adjustable connector assemblies shown in FIG. 1 underlying the triangular assembly and in FIG. 4 connected to a bottom link 55 of the triangular array are used to connect the triangular arrays with the ground based profile members 41. Each one of these adjustable connector assemblies comprises a bolt 27 and a pair of nuts 29a, 29b with nut 29a fixedly mounted within a groove 43 of profile member 41, whilst nut 29b overlies nut 29a and is being screwed along the bolt 27 so as to provide flush seating of a pair of end links 55 of the triangular array 53 and through those links of the entire integrated triangular array 53 onto the ground. The bolt 27 is being screwed through rotation thereof by means of a key being applied onto bilaterally provided flat portions 27a thereof. As shown in FIG. 1 each one of the upper series of four links 54 of the triangular array 53 is connected to the overlying profile member 24 by means of a fixed connector assembly comprising a bolt 10 and a nut 12. The triangular array of the invention is designed so that when based on the intended location, it may automatically align the photovoltaic panels mounted thereupon at a preferred inclination of 30°, such inclination being considered an ideal inclination to ensure maximal exposure to solar radiation and productivity of the photovoltaic cells. The length of tubular members 1 determines the total size of the desired structure. A number of integrated triangular arrays 53 are supported together lined in parallel arrays at a desired horizontal distance that is determined by the width of the panels and the subsequently necessary length of tubular members 21, which are employed to connect adjacent triangular arrays 53.

FIGS. 5, 7 and FIGS. 6, 8 correspondingly show exploded and assembled views of the links 54 and 55 respectively employed in the construction of the triangular array 53 of the invention. Link 54 comprises two portions 4, 14 and link 55 similarly comprises two portions 23, 22. A central hole 15 is provided in portion 14 of link 54 and in portion 23 of link 55, whereas a central threaded hole 13 is provided in portion 4 and 22 of links 54 and 55 respectively. Link 54 comprises four and link 55 comprises six equidistantly spaced semi-cylindrical recesses 5 around the circumference of portions 4, 14 and portions 22, 23 respectively. The recesses 5 provided in portions 4 and 22 are provided with a transversely extending projection 6, The assembly of each of the links 54 and 55 is being performed with the abutment of portions 4, 14 and portions 22, 23 respectively, the passage of a threaded bolt 18 with a head 16 having a central longitudinal bore 17 and a transverse lateral threaded bore 19 through the axially aligned holes 15, 13 and screwing of this threaded bolt 18 into the threaded hole 13 and the mutual abutment of the semi-cylindrical recesses 5 of portion 4 with those of portion 14 and mutual abutment of the semi-cylindrical recesses 5 of portion 22 with those of portion 23 thereby forming four and six cylindrical recesses adapted to receive the radially extending tubular members 1.

Each one of the tubular members 1 is provided with a side hole 2 proximally to both ends thereof, whereby the abovementioned transversely extending projection 6 in the recesses 5 of portions 4 and 22 of links 54 and 55 respectively is being introduced in this hole 2 thereby fixedly mounting the tubular member in a recess provided in the circumference of the links 54 and 55 assembled by portions 4, 14 and 23, 22 respectively. Each tubular member 1 is further internally provided with a small raise 3 which provides a guiding reference for drilling the abovementioned holes 2 in an appropriate device.

Figure 2:
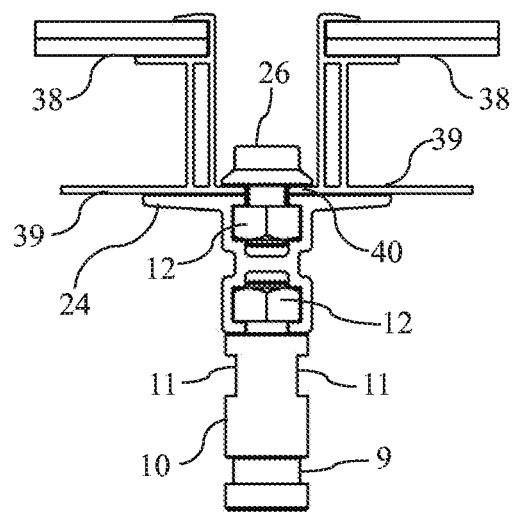
FIG. 2 shows a frontal view of a bolt and nut connector assembly used to connect a profile member that is being connected to the profile frame of a photovoltaic panel according to a first embodiment of the invention.

Each link 54 is provided with a cavity 7 with a protruding ring 8 at the bottom thereof adapted to receive the abovementioned bolt 10 that connects the integrated triangular array with the overlying profile member that is connected to the profile frame of the photovoltaic panels. As shown in FIG. 2 this bolt 10 is provided with a circumferential recess 9, which is being adapted to receive the protruding ring 8. Following introduction of bolt 10 in a groove of the profile member that connects the triangular array 53 with the profile frame of the photovoltaic panels, bolt 10 is being screwed through rotation thereof by means of a key being applied onto bilaterally provided flat portions 11, thereby advancing within the nut 12 mounted within the abovementioned groove for fixedly connecting the link 54 of the triangular array 53 with the overlying profile member connected with the frame of the photovoltaic panels. A vertically oriented cylindrical recess of the six recesses adapted to receive tubular members 1 in a pair of end links 55 at the bottom of the triangular array 53 is being adapted to receive the adjustable connector assembly with the bolt 27 and nuts 29a, 29b so that the laterally extending projections 6 are being brought in abutment with the circumferential grooves 28 of bolts 27 with the nuts 29a fixedly mounted within the abovementioned groove 43 of the profile member 41. The bolt 27 is being advanced longitudinally along nut 29b for connecting and immobilizing at a flush level the links 55, which are located adjacently to the profile member 41 and support the triangular array 53 onto the ground.

A plurality of tubular members 21 is employed in the connection of successive parallel triangular arrays 53 at a distance corresponding to the width of a photovoltaic panel. Each tubular member 21 is being mounted within the central longitudinal bore 17 of the head 16 of the threaded bolt 18 and is being stabilized therein by means of a screw 20 being driven into the transverse lateral threaded bore 19 of the head 16.

In accordance with a preferred embodiment of the invention, the profile member 41 with the triangular array 53 mounted thereupon is supported by pillars 51. FIG. 4 shows connection of the profile member 41 with the triangular array 53 mounted thereupon with a pillar 51 that is mounted onto the ground, Each pillar 51 comprises a flat head 52 and a bearing 45 onto the flat head 52, a bolt 44 extending vertically upwardly at the center of the bearing 45, a nut 12 being inserted within a groove 42 of the profile member 41. The bearing 45 is being fixedly connected to profile member 41 through screwing of the bolt 44 into the nut 12. A pair of retainer frames 48 is provided on either side of the flat head 52, each of the retaining frames 48 being provided with a cavity 50 and with a bore 49 adapted to receive a bolt 47. The flat head 52 is adapted to being firmly retained within cavities 50 of the retaining frames 48 and bolt 47 is being advanced longitudinally along a threaded bore 46 of the bearing 45 in order to fixedly connect the flat head 52 of pillar 51 with the bearing 45.

Figure 3:
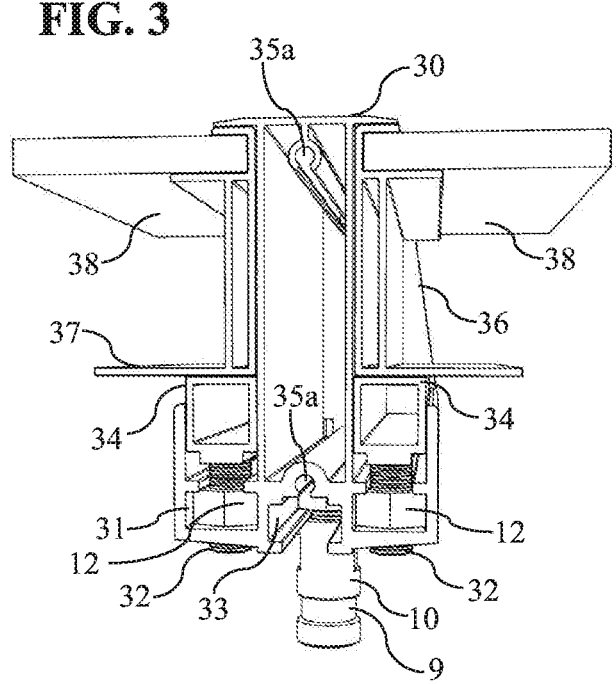
FIG. 3 shows in perspective the bolt and nut connector assembly used to connect a profile member that is being connected to the profile frame of a photovoltaic panel according to a second embodiment of the invention.
Figure 3A:
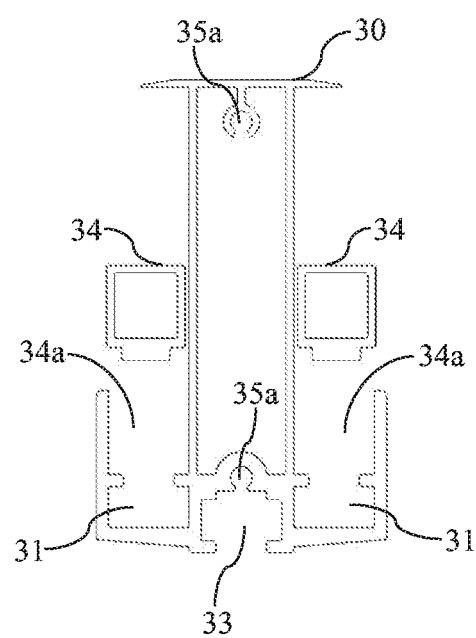
FIG. 3a shows a sectional view of the profile member of FIG. 3.
Figure 3B:
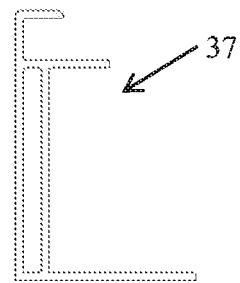
FIG. 3b shows a sectional view of the profile frame of a photovoltaic panel shown in FIG. 3.
Figure 3C:
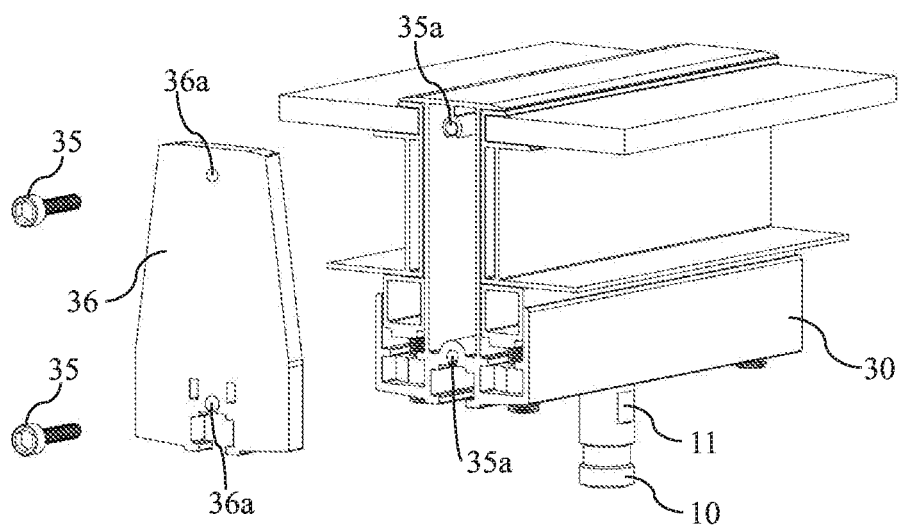
FIG. 3c shows in perspective along with the arrangement of FIG. 3 an illustrative embodiment of an end cap that is employed to seal a terminal end of the profile member of FIG. 3.

In accordance with a first embodiment of the invention the triangular array of the support basement for photovoltaic panels is being adapted to support fixedly mounted photovoltaic panels within frames constructed with a profile member 37 shown in FIG. 3b being mounted onto a profile member 30 (FIG. 3). Profile member 30 comprises a chamber 34a and a chamber 31 underlying chamber 34a on either side of centrally located groove 33 adapted to receive the fixed connector assembly comprising the abovementioned nut 12 and bolt 10 that is adapted to connect the link 54 with the profile member 30. A pair of profile members 34 is being introduced within the chambers 34a and nuts 12 are being inserted within the chambers 31, wherein as underlying screws 32 are being screwed into nuts 12, the profile members 34 are being pushed upwardly, thereby accordingly pressing upwardly and immobilizing the frame constructed with the profile member 37 of the photovoltaic panel. As shown in FIG. 3c, the profile members 30 are provided with end caps 36, an end cap 36 being provided with holes 36a that are brought in alignment with receiving recesses 35a of the profile member 30 when the end cap 36 is mounted at a terminal end thereof, screws 35 passing through holes 36a and coincident recesses 35a being employed to securely fix the end cap 36 onto the profile member 30. In this manner the photovoltaic panels advantageously terminate in an aligned orientation.

Figure 2A:
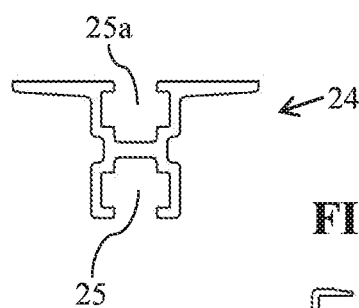
FIG. 2a shows a sectional view of the profile member of FIG. 2.
Figure 2B:
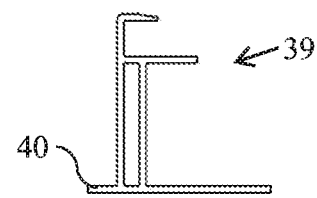
FIG. 2b shows a sectional view of the profile frame of a photovoltaic panel shown in FIG. 2.

In accordance with a second embodiment of the invention the triangular array of the support basement for photovoltaic panels is being adapted to support fixedly mounted photovoltaic panels within frames constructed with a profile member 39 (FIG. 2b) being mounted onto a profile member 24 (FIG. 2a). The profile member 24 comprises a chamber 25a overlying a groove 25 thereof that is adapted to receive the fixed connector assembly comprising the nut 12 and bolt 10 that connects a link 54 with the profile member 24. The profile member 39 is advantageously provided with a laterally extending surface 40 that lies above and abuts chamber 25a, wherein a nut 12 being introduced within chamber 25a and a bolt 26 is being screwed into this nut 12 within the chamber 25a as a head of the bolt 26 abuts the abovementioned laterally extending surfaces 40 of profile members 39 of a pair of adjacent photovoltaic panels, whereby as the bolt 26 is being screwed into nut 12 and pressure is being exerted onto the laterally extending surfaces 40, profile members 39 are being fixedly connected to the profile member 24.

In accordance with a second embodiment of the invention the triangular array of the support basement for photovoltaic panels is being adapted to support extensible and collapsible photovoltaic panels within frames constructed with profile members 69, which are being arranged to slide onto profile members 84 shown in FIGS. 16 and 16a. The profile member 84 comprises chambers 88a on either side of a centrally located groove 88 that is adapted to receive the fixed connector assembly comprising the nut 12 and bolt 10 that is used to connect the link 54 with the profile member 84. Each chamber 88a is provided with a vertically upwardly extending member 85 extending along the profile 84, wherein profile member 84 extends upwardly past the centrally located groove 88 in a columnar member 84a and a rectangular member 84b on top of the columnar member 84a. The columnar member 84a has a width that approximately corresponds to the width of groove 88 including the side walls thereof, whereas the rectangular member 84b has a width that corresponds to the overall width of the central groove 88 together with the chambers 88a provided at the sides thereof.

A retraction mechanism is employed to effect retraction of the photovoltaic panels within a protective housing 86 during the night and upon emergence of adverse weather conditions. In accordance with an illustrative embodiment of the invention this retraction mechanism comprises a plurality of a sequential arrangement of X-configured assemblies, each one of these X-configured assemblies comprising a pair of arms 56 with a centrally located hole 57, the arms 56 being pivotally connected with a shaft 66 at the middle thereof and provided with rolling wheels 67 mounted along the shaft 66 provided with an end recess receiving a washer 63 and snap ring 62 at the end thereof. Each arm 56 of an X-configured assembly is provided with an end groove 59 with a bore 58 at both ends thereof, such groove 59 being adapted to receive a shaft 60 provided with a circumferential end recess 61 to be securely held by means of a washer 63 and a snap ring 62. Shafts 60 are thereby adapted to provide connection of adjacent arms 56 in each pair of consecutive X-configured assemblies. Each arm 56 is further provided with a pair of threaded bores 64 on either side of shaft 66. The threaded bores 64 are being brought in abutment with a pair of holes 70 provided at each end of each one of the profile frame members 69 of the photovoltaic panels and bolts 65 are being employed to fixedly connect each side of each one of the photovoltaic panels 69 with one X-configured assembly. The rolling wheels 67 are provided with a central groove 68 that is adapted to slide onto the vertically upwardly extending members 85 of profile member 84, whereby the rolling wheels 67 are accommodated in between the chambers 88a on either side of the centrally located groove 88 and the rectangular member 84b of profile member 84.

An upper end of profile member 84 is provided with a pair of opposing holes 83 at the side walls of the central columnar member 84a. An elongate screw 72 with a clockwise and a counterclockwise trapezoidal threading is mounted in between a pair of rotatable nuts 71 provided at the ends of the arms 56 of the X-configured assembly located proximally to the protective housing 86. A bearing 73 is mounted at the middle of the elongate screw 72 and a first portion 73a of this bearing 73 is provided with an array of holes 74. The abovementioned first portion 73a of bearing 73 abuts an inner wall of the protective housing 86 with the holes 74 thereof being aligned with a correspondingly spaced array of holes 87 of the protective housing 86. Accordingly, clamping bolts passing through the aligned holes 74 and 87 fixedly connect bearing 73 with the protective housing 86. A second portion 73b of bearing 73 is provided with a through hole 82 and is being introduced within the columnar member 84a at the end of the profile member 84, whereby the through hole 82 is being aligned with the opposing holes 83 of the columnar member 84a and a shaft 83a passing through the aligned holes 82-83 fixedly connects bearing 73 with the profile member 84.

A lower end of the elongate screw 72 has a hexagonal configuration 75 and is provided with a centrally located threaded hole 76 adapted to receive a bolt 77 whereupon a wheel 78 is being supported. The wheel 78 is provided with a pair of recesses with a toothed configuration 79, whereby a pair of timing belts 80 being provided with a toothed configuration that corresponds to the toothed configuration of the abovementioned pair of recesses 79 are arranged to pass through the pair of recesses with a toothed configuration 79 and transfer a rotational motion produced by a motor 81 to at least a pair of adjacent elongate screws 72, whereby the elongate screws 72 are rotated in a clockwise or anti-clockwise direction thereby retracting within the protective housing 86 or extending outwardly thereof in an operating condition the sequential arrangement of X-configured assemblies and accordingly of the extensible and collapsible photovoltaic panels with the frame profile member 69 carried thereupon.

The construction of the support basement of the invention requires appropriate dies for manufacturing the profile members required. An illustrative recommended appropriate material for the construction of such profile members would be aluminium 6061. The bolt 16 employed to connect mating portions of links 54, 55 can be constructed by a hexagonal profile with a hole in the center thereof so as to allow passage of tubular member 21. Processing in an automatic lathe thereafter easily produces the required threading. The construction of the pair of arms 56 of the X-configured assemblies can be effected through a casting mold process for mass production of these components. The bolts 10, 27 and 72 as well as the nuts 71 can be manufactured from stainless steel in an automatic lathe.

Figure 20:
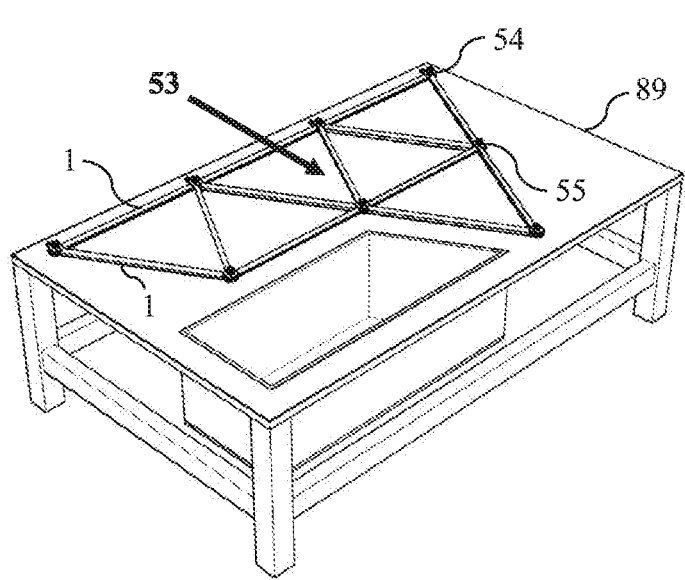
FIG. 20 shows a perspective view of a specially designed working bench arranged to provide handy assembly of the triangular arrays of the support basement of the invention.

A working bench 89 is shown in FIG. 20 that is considered appropriate for fast assembling of the triangular arrays. The working bench 89 is provided with appropriately located axes within which are being inserted the bolts 16 and the portions 4 and 22 of links 54 and 55 respectively, thereby resulting in a safe and easy assembling of parts even by non skilled staff. The storage and protective housing 86 can be manufactured from an aluminium foil, which will be formed and internally welded, will be performed laterally.

The invention claimed is:

1. A photovoltaic panel support basement, comprising:
a plurality of arrays (53), each array of the plurality of arrays comprising:
a tubular body assembly, comprising:
a plurality of first links (54),
a plurality of second links (55), and
a plurality of first tubular members (1) connecting the plurality of first links and the plurality of second links together,
wherein each first tubular member of the plurality of first tubular members is secured to and longitudinally extends between two first links of the plurality of first links, two second links of the plurality of second links, or a first link of the plurality of first links and a second link of the plurality of second links, and
wherein each first link of the plurality of first links and each second link of the plurality of second links is secured to at least two other links, the at least two other links including one or more first links of the plurality of first links, one or more second links of the plurality of second links, or a combination thereof,
a panel profile member assembly, comprising:
a panel profile member (84) having a first chamber (88a) on one side of a groove (88) and a second chamber (88a) on an opposite side of the groove (88), the groove extending longitudinally along a bottom surface of the panel profile member, a first member (85) vertically extending above the first chamber and a second member (85) vertically extending above the second chamber, the first member and the second member longitudinally extending along a length of the panel profile member, a columnar member (84a) vertically extending above the groove (88), and a rectangular member (84b) positioned on top of the columnar member (84a), the columnar member and the rectangular member longitudinally extending along the length of the panel profile member,
wherein the panel profile member has a first hole (83) through each opposing side wall of the columnar member along a free end of the panel profile member (84); and
a plurality of fixed connector assemblies, each fixed connector assembly of the plurality of fixed connector assemblies comprising:
a first bolt (10), and
a first nut (12),
wherein the first nut is fixedly mounted within the groove, the first bolt is fastenably securable to the first nut, and the first bolt is connectable to a corresponding first link of the plurality of first links,
wherein the panel profile member is removably securable to the tubular body assembly;
a plurality of adjustable connector assemblies, each adjustable connector assembly comprising:
a second bolt (27),
a bottom nut (29a), and
a top nut (29b),
wherein the second bolt is fastenably securable to the bottom nut and the top nut, and the second bolt is connectable to a corresponding second link of the plurality of second links;
a plurality of base profile members (41) extending perpendicularly to each array of the plurality of arrays, each base profile member of the plurality of base profile members having a top groove (43) extending along a length of the base profile member, wherein each said array of the plurality of arrays is securable to each said base profile member of the plurality of base profile members by a corresponding adjustable connector assembly of the plurality of adjustable connector assemblies, and
wherein, for each said adjustable connector assembly, the bottom nut is mounted within the top groove of a corresponding base profile member of the plurality of base profile members, the second bolt is fastenably securable to the bottom nut and to the top nut such that a portion of the corresponding base profile member is secured between the top nut and the bottom nut, and the second bolt is secured to the corresponding base profile member (41) within the top groove;
a plurality of second tubular members (21), each second tubular member (21) of the plurality of second tubular members arranged to horizontally extend through each said array of the plurality of triangular arrays, each said second tubular member extending parallel to each other second tubular member of the plurality of second tubular members, wherein each said second tubular member is mounted through a similarly positioned first link of the plurality of first links or a similarly positioned second link of the plurality of second links of each said array, each said second tubular member perpendicularly oriented with respect to each said array of the plurality of arrays;
a plurality of retraction mechanisms, each retraction mechanism of the plurality of retraction mechanisms comprising:
an elongate screw (72) with a length of clockwise trapezoidal threading and a length of counter-clockwise trapezoidal threading;
a first elongate screw nut (71) and a second elongate screw nut (71), the first elongate screw nut provided along the length of clockwise trapezoidal threading and the second elongate screw nut provided along the length of counter-clockwise trapezoidal threading;
an attachment assembly to secure the elongate screw to the free end of a corresponding panel profile member of a corresponding array of the plurality of arrays, the attachment assembly comprising:
a horizontal bearing member (73a) having a second hole (74); and
a vertical bearing member (73b) having a through hole (82) corresponding to the first hole through each opposing side wall of the columnar member,
wherein the vertical bearing member is connected to the horizontal bearing member, and the elongate screw is mounted between the vertical bearing member and the horizontal bearing member, and
wherein the vertical bearing member is insertable within the columnar member such that the through hole is aligned with the first hole through each opposing side wall of the columnar member, and a shaft (83a) is insertable into the through hole and the first hole through each opposing side wall of the columnar member to fixedly connect the attachment assembly to the corresponding panel profile member;

two sets of collapsible assemblies, each set of collapsible assemblies having one or more pair of X-configured arms, each pair of X-configured arms comprising:
an inner arm having a first inner arm opposing end and a second inner arm opposing end, a first inner arm assembly hole and a second inner arm assembly hole, the first inner arm assembly hole located along the first inner arm opposing end and the second inner arm assembly hole located along the second inner arm opposing end, two bore holes, and an inner arm central hole located between the two bore holes;
an outer arm having a first outer arm opposing end and a second outer arm opposing end, a first outer arm assembly hole and a second outer arm assembly hole, the first outer arm assembly hole located along the first outer arm opposing end and the second outer arm assembly hole located along the second outer arm opposing end, and an outer arm central hole; and
a connector device securing the inner arm and the outer arm together, the connector device comprising:
a shaft (66); and
a wheel (67) having a central groove (68) along a circumference of the wheel, the wheel adapted to roll along either the first member or the second member (85) of the corresponding panel profile member (84) via the central groove (68), wherein the wheel is rotatably secured around the shaft, and the shaft is inserted through the inner arm central hole and the outer arm central hole;
wherein at least one pair of X-configured arms of the one or more pair of X-configured arms of each of the two sets of collapsible assemblies is pivotably attached to the first elongate screw nut and the second elongate screw nut;
at least one photovoltaic cell, each photovoltaic cell of the at least one photovoltaic cell framed by a profile frame member (69), the profile frame member having a first opposing end and a second opposing end, the first opposing end attached to a corresponding inner arm of one pair of X-configured arms of one retraction mechanism of the plurality of retraction mechanisms and the second opposing end attached to a corresponding inner arm of another pair of X-configured arms of another retraction mechanism of the plurality of retraction mechanisms;
a protective housing (86) having a plurality of connection holes (87) and securable to the attachment assembly of each retraction mechanism of the plurality of retraction mechanisms,
wherein each connection hole of the plurality of connection holes corresponds to the second hole of a corresponding retraction mechanism of the plurality of retraction mechanisms, and a clamping bolt through each said connection hole and the second hole of the corresponding retraction mechanism secures the protective housing to each retraction mechanism the plurality of retraction mechanisms, and
wherein the protective housing covers a length of the profile member (84) of each array of the plurality of arrays.

2. The support basement for photovoltaic panels according to claim 1, wherein one or more frames are fixedly mounted to a profile member (37), said profile member (37) further mounted to a profile member (30), said profile member (30) comprising a chamber (34*a*) and a chamber (31), underlying said chamber (34*a*), on either side of a centrally located groove (33) adapted to receive said plurality of fixed connector assemblies, a profile member (34) introduced within each said chamber (34*a*) and a nut (12) inserted within each said chamber (31), and one or more nuts (12) secured with each said chamber (31), wherein as a screw (32) is fastened into each said one or more nuts (12), said profile member (34) is pushed upwardly, thereby securing said profile member (37) to said profile member (30), said profile member (30) provided with an end cap (36).

3. The support basement for photovoltaic panels according to claim 1, wherein one or more are fixedly mounted to a profile member (39), said profile member (39) further mounted onto a profile member (24), said profile member (24) comprising a chamber (25*a*) overlying a groove (25) adapted to receive said plurality of fixed connector assemblies, said profile member (39) provided with a laterally extending surface (40) abutting said chamber (25*a*), a nut (12) introduced within said chamber (25*a*) and a bolt (26) screwed into said nut (12) within said chamber (25*a*), a head of said bolt (26) abutting said laterally extending surface (40) of said profile member (39), wherein as said bolt (26) is screwed into said nut (12) and pressure is exerted onto said laterally extending surface (40), said profile member (39) is fixedly connected to said profile member (24).

4. The photovoltaic panel support basement of claim 1, wherein each said first link (54) of the plurality of first links (54) further comprises:
a first half portion (4) having a central threaded hole (13) and four first half semi-cylindrical recesses (5) spaced around a circumference of the first half portion, wherein each of the four first half semi-cylindrical recesses include a transversely extending projection (6); and
a second half portion (14) having a central hole (15) and four second half semi-cylindrical recesses (5) spaced around a circumference of the second half portion,
wherein abutment of the first half portion and the second half portion forms four cylindrical recesses from the four first half semi-cylindrical recesses and four second half cylindrical recesses, each of the four cylindrical recesses adapted to receive a first tubular member (1) of the plurality of first tubular members,
wherein abutment of the first half portion and the second half portion forms a cavity (7) in which the first bolt of a fixed connector assembly of the plurality of fixed connector assemblies is securable, and
wherein abutment of the first half portion and the second half portion forms a central bore from the central threaded hole and the central hole.

5. The photovoltaic panel support basement of claim 4, wherein each said first tubular member (1) of the plurality of first tubular members has a projection hole (2) at a free end, and wherein the transversely extending projection (6) is insertable within the projection hole (2).

6. The photovoltaic panel support basement of claim 4, further comprising a plurality of threaded fasteners, each threaded fastener comprising:
a cylindrical threaded bolt (18):
a head (16) positioned along a free end of the cylindrical bolt; and
a central longitudinal bore (17) extending axially through the cylindrical bolt and the head, wherein a second tubular member of the plurality of second tubular members is insertable through the central longitudinal bore of a threaded fastener of the plurality of threaded fasteners, and the cylindrical threaded bolt of the threaded fastener is threadingly securable to the central threaded hole (13) of a respective first link (54) of the plurality of first links.

7. The photovoltaic panel support basement of claim 1, wherein each said second link (55) of the plurality of second links (55) further comprises:
   a first half portion (22) having a central threaded hole (13) and six first half semi-cylindrical recesses (5) spaced equidistantly around a circumference of the first half portion, wherein each of the six first half semi-cylindrical recesses include a transversely extending projection (6); and
   a second half portion (23) having a central hole 15 and six second half semi-cylindrical recesses (5) equidistantly spaced around a circumference of the second half portion,
   wherein abutment of the first half portion and the second half portion forms six cylindrical recesses from the six first half semi-cylindrical recesses and six second half cylindrical recesses, and
   wherein abutment of the first half portion and the second half portion forms a central bore from the central threaded hole and the central hole.

8. The photovoltaic panel support basement of claim 7, wherein each said first tubular member (1) of the plurality of first tubular members has a projection hole (2) at a free end, wherein the transversely extending projection (6) is insertable within the projection hole (2).

9. The photovoltaic panel support basement of claim 7, further comprising a plurality of threaded fasteners, each threaded fastener comprising:
   a cylindrical threaded bolt (18):
   a head (16) positioned along a free end of the cylindrical bolt; and
   a central longitudinal bore (17) extending axially through the cylindrical bolt and the head,
   wherein a second tubular member of the plurality of second tubular members is insertable through the central longitudinal bore of a threaded fastener of the plurality of threaded fasteners, and the cylindrical threaded bolt of the threaded fastener is threadingly securable to the a central threaded hole (13) of a corresponding second link (55) of the plurality of second links.

10. The photovoltaic panel support basement of claim 1, wherein a width of the columnar member (84a) is equal to a width of the groove (88), and a width of the rectangular member (84b) is equal to an overall width of the groove (88), the first chamber, and the second chamber.

11. The photovoltaic panel support basement of claim 1, wherein the elongate screw has a free end with a hexagonal configuration (75), the free end of the elongate screw provided with a threaded hole (76) to receive a wheel bolt (77).

12. The photovoltaic panel support basement of claim 11, wherein each retraction mechanism further comprises:
   a wheel (78) secured upon the free end of the elongate screw by the wheel bolt, the wheel having two recesses (79), each of the two recesses having a toothed configuration (79),
   two timing belts (80), each of the two timing belts provided with a corresponding toothed configuration to interact with the toothed configuration of one of the two recesses of the wheel,
   a motor configured to produce rotational motion and transfer the rotational motion to the wheel via one or more of the two timing belts, thereby rotating the elongate screw in a clockwise direction or a counter-clockwise direction.

13. The photovoltaic panel support basement of claim 1, wherein the outer arm of the at least one pair of arms is rotatably secured to the first elongate screw nut by a first shaft (60) and the inner arm of the at least one pair of arms is rotatably secured to the second elongate screw nut by a second shaft (60).

14. The photovoltaic panel support basement of claim 1, wherein each set of X-configured assemblies has at least two pairs of arms, wherein each pair of arms of the at least two pairs of arms is rotatably secured to at least one other pair of arms of the at least two pairs of arms.

15. The photovoltaic support basement of claim 1, further comprising a plurality of pillars (51) for each said base profile member, each pillar of the plurality of pillars secured to a ground at one end, and having a flat head (52) secured at an opposite top end, a bearing (45) secured on top of the flat head, a pillar bolt (44) extending vertically upwardly at a center of the bearing, and a pillar nut (12),
   wherein each said base profile member has a bottom groove (42) extending longitudinally along a bottom surface, and
   wherein the pillar nut of each base profile member is inserted within the bottom groove (42) of a corresponding base profile member, and the pillar bolt is fastened to the pillar nut to connect the corresponding base profile member to the bearing.

16. The photovoltaic support basement of claim 15, wherein the bearing is secured on top of the flat head by a pair of retainer frames (48) provided on either side of the flat head, each retaining frame of the pair of retainer frames provided with a cavity (50) and with a bore (49) above the cavity adapted to receive a horizontal bolt (47), the flat head adapted to be firmly retained within the cavity of each said retaining frame, and the horizontal bolt advanced longitudinally along a corresponding vertical threaded bore (46) of the bearing to fixedly connect the flat head with the bearing.

* * * * *